Dec. 15, 1942.  H. F. KHOENLE  2,305,533
FISHING REEL
Filed May 7, 1940

INVENTOR
HERMAN F. KHOENLE
BY
Ely & Frye
ATTORNEYS

UNITED STATES PATENT OFFICE 2,305,533

FISHING REEL

Herman F. Khoenle, Akron, Ohio, assignor to The Enterprise Manufacturing Company, Akron, Ohio, a corporation of Ohio Application May 7, 1940, Serial No. 333,780

3 Claims. (Cl. 242—84.4)

The present invention relates to fishing reels provided with automatic level-wind mechanism which is driven in synchronism with the spool so as to lay the line evenly across the spool. This type of mechanism usually consists of a reversely threaded shaft in driving connection with the spool, a carriage movable over or along the shaft and a so-called half-nut rotatably mounted in the carriage and tracking on the thread of the shaft. The half-nut is removable so that the level-wind mechanism may be taken down for cleaning, oiling and repairs.

In former reel constructions of this type, the half-nut is held in its position in the carriage by a cap screw or plate and in order to remove the half-nut, it has been necessary to remove the nut-retaining means which often causes the accidental loss of part or all of the nut-retaining means and makes the level-wind mechanism inoperative. As the fisherman will often clean and oil the reel while at the fishing grounds or in a remote location, this is an annoying feature of this type of reel.

It is the object of the present invention to provide a half-nut retainer which is associated preferably with the level-wind carriage in such a way that it can be moved from its normal or nut-retaining position to a position to free the half-nut without becoming disassociated from the reel itself. In this way the hazard of losing a vital part of the reel is reduced and the fisherman may remove the half-nut without loss of the half-nut retainer.

The best known or preferred form of the invention is shown and described herein, but it will be understood that other or different means may be provided for accomplishing the purposes of the invention, all within the scope of the claims appended hereto.

Figure 1:
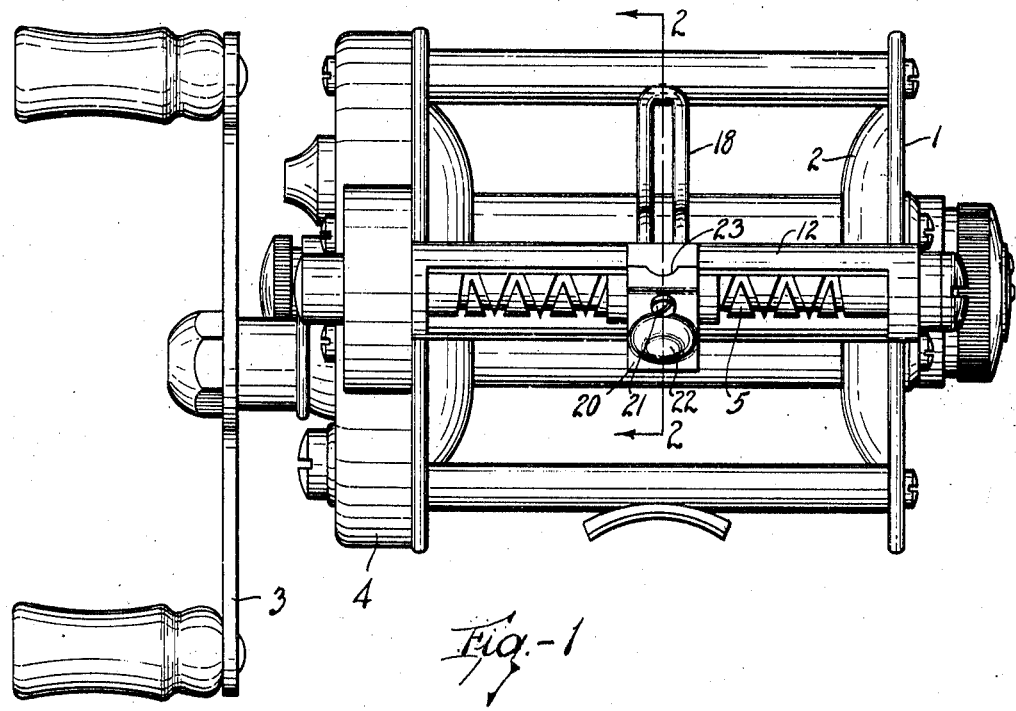
Fig. 1 is a side view of an ordinary and well known type of level-wind reel with the improved half-nut retaining means mounted thereon.

The reel consists of a usual frame 1 carrying a spool 2 driven by crank 3. Within the gear casing 4 is any suitable train of gearing (not shown) connecting the crank shaft, the spool and the reversely threaded shaft 5 which drives the level-wind mechanism.

In the form shown, this consists of a carriage 10 movable over and in sliding engagement with the shaft 5, the shaft casing 12 being cut away adjacent the carriage to permit the carriage to pass to and fro. In the carriage is formed a socket 14 in which is rotatably mounted the half-nut 15, having at its inner end a web or blade 16 engaging the screw thread. The outer end of the half-nut may have a recess 17 for the insertion of a match stem or the like by which the half-nut may be lifted out of place. As the half-nut engages the double-thread on the shaft 5, it is free to oscillate in its socket. The carriage supports the line guide 18 by which the line is guided to the spool.

The half-nut is held in position to engage the screw-threaded shaft by any suitable means. In the form shown, a light plate or retainer 20 is employed which covers the under side of the carriage and is held in position by a screw 21 engaging the carriage. The center of the plate is embossed at 22 to provide an end bearing for the half-nut. The formation 22 strengthens the plate and as the plate is continuous it covers the socket for the half-nut and prevents dirt from lodging in the half-nut socket. As the half-nut projects from the face of the carriage, a purchase is provided by which the half-nut may be seized to lift it out of the carriage in the event it becomes badly corroded. On the extremity of the plate beyond the screw may be provided a recess 23 which is so located as to register with the socket when the plate is turned, but this feature is not essential as the plate may be so proportioned as to free the half-nut when the plate is turned on its holding means.

Figure 2:
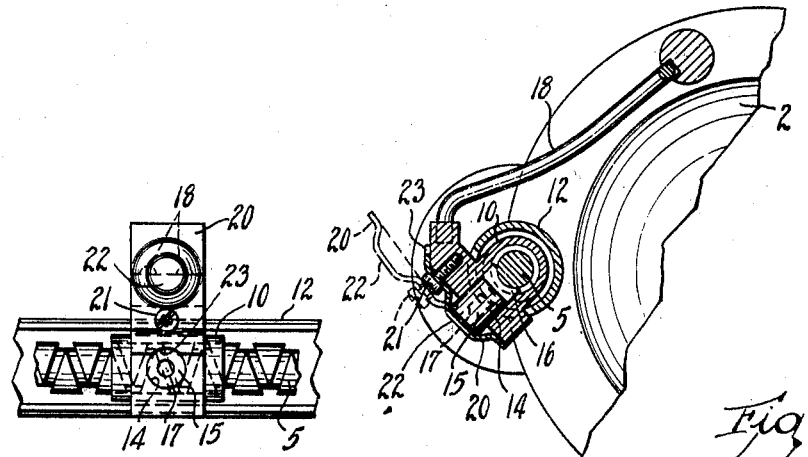
Fig. 2 is a cross section through the level-wind carriage, the normal or operating position being shown in full lines and the open position in dotted lines.
Figure 3:
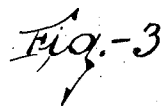
Fig. 3 is a fragmentary side view of the carriage showing the retaining means in position to free the half-nut.

It is noted that the screw 21 is of sufficient length so that when it is only partially withdrawn, as shown in dotted lines in Fig. 2, the retaining plate may be turned so that it will permit the half-nut to be removed from its socket without removing the plate wholly from the carriage. In this way the half-nut may be taken out of the reel without detaching any other part, or if the level wind mechanism is to be removed, the number of loose parts is reduced. When the half-nut is reinserted, the retaining plate is moved into the full line position of Fig. 2 and the screw brought down into its final position holding the plate in retaining position.

The plate is preferably provided with a socket to form a bearing for the half-nut and the other end of the plate is preferably bent over the angular face of the carriage so that when the screw 21 is in, the plate cannot accidentally turn on the screw and free the half-nut. It will also be observed that the angular formation on the plate serves to insure that the socket or embossed formation 22 is in alignment with the socket on the carriage in which the half-nut is located. It is preferred to form the overhanging portion at a slightly less angle than found on the two angular surfaces of the carriage, the purpose of which is to bind the plate more firmly in position as the screw 21 is forced home, because the extremities of the plate contact the carriage first, and the advancement of the screw then draws the main portion of the spring plate against the face of the carriage.

Other means may be provided than that shown for holding the half-nut in position and for holding the retaining means on the reel or carriage to prevent its loss when moved to release the half-nut, and the invention is not restricted to the means specifically shown for either purpose.

What is claimed is:

1. In a fishing reel and a level-wind carriage thereon, a threaded shaft to propel the carriage, a socket being provided in the carriage, a half-nut in the socket to engage the shaft and projecting beyond the surface of the carriage, and means for holding the half-nut in operative position, said means consisting of a retaining plate secured to the carriage, said plate having a socket to receive the projecting end of the half-nut, and means to permit the retaining plate to be moved to allow removal of the half-nut without disconnecting the retaining plate from the carriage.

2. The combination of a fishing reel comprising a threaded shaft, a level wind carriage having an angular outer face, a half-nut in the carriage engaging the shaft, the half-nut having a portion projecting above the face of the carriage, a plate on the carriage having an angular portion to fit over the angular face of the carriage and a socket to form a bearing for the projecting portion of the half-nut, said plate being rotatable to permit removal of the half-nut without detachment of the plate from the carriage.

3. A level wind fishing reel comprising a carriage mountable upon a threaded shaft and formed with an angular outer face and a socket opening onto the latter, a half-nut in said socket engaging said shaft, a plate on the outer face of said carriage having an end portion covering said socket, said plate being angularly formed and adapted to fit the angular face of the carriage, and means located between the ends of the plate for securing the same to the carriage, said means enabling the plate to be rotated to reverse the positions of the ends thereof, and a recess in one end of the plate adapted to be brought into registry with the socket in the carriage to enable the removal of the half-nut therefrom.

HERMAN F. KHOENLE.